(12) United States Patent
Thomas et al.

(10) Patent No.: US 6,520,537 B2
(45) Date of Patent: Feb. 18, 2003

(54) AUTOMOTIVE VEHICLE SENSING SYSTEM FOR SELECTIVE AIR BAG DEPLOYMENT

(75) Inventors: Scott David Thomas, Novi, MI (US); Michael John Wolanin, Hartland, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/887,961

(22) Filed: Jun. 25, 2001

(65) Prior Publication Data

US 2002/0195806 A1 Dec. 26, 2002

(51) Int. Cl.⁷ .............................................. B60R 21/32
(52) U.S. Cl. ....................................................... 280/735
(58) Field of Search ................................. 280/735, 736, 280/737, 740, 741

(56) References Cited

U.S. PATENT DOCUMENTS

| | | | |
|---|---|---|---|
| 5,695,214 A | 12/1997 | Faigle et al. | 280/735 |
| 5,887,894 A | 3/1999 | Castagner et al. | 280/743.2 |
| 6,275,146 B1 * | 8/2001 | Kithil et al. | 180/272 |
| 6,292,727 B1 * | 9/2001 | Norton | 180/271 |
| 6,345,839 B1 * | 2/2002 | Kuboki et al. | 280/735 |

* cited by examiner

*Primary Examiner*—Paul N. Dickson
*Assistant Examiner*—Faye M. Fleming
(74) *Attorney, Agent, or Firm*—Laura C. Hargitt

(57) ABSTRACT

An internal vehicle sensing system for assisting in controlling deployment of an air bag is disclosed. The sensing system includes at least one sensor that forms a sensor array designed to detect a portion of an individual. The sensing system sends signals to the air bag system based upon objects detected and signals, commands or allows full deployment, partial deployment, or suppression of deployment of an air bag.

5 Claims, 13 Drawing Sheets

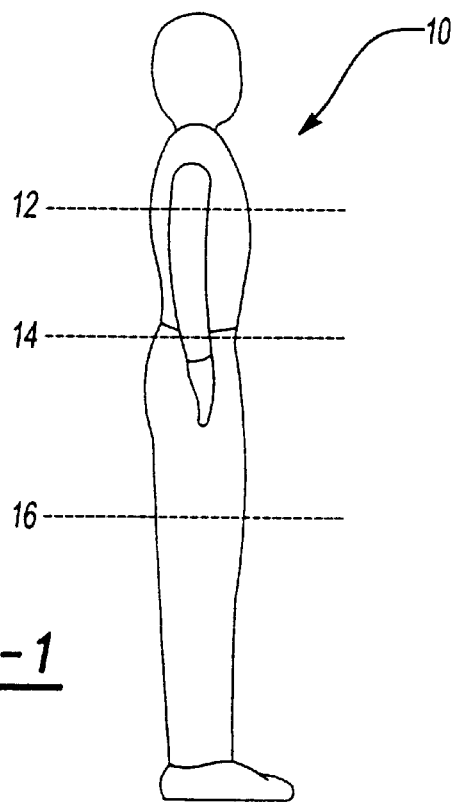
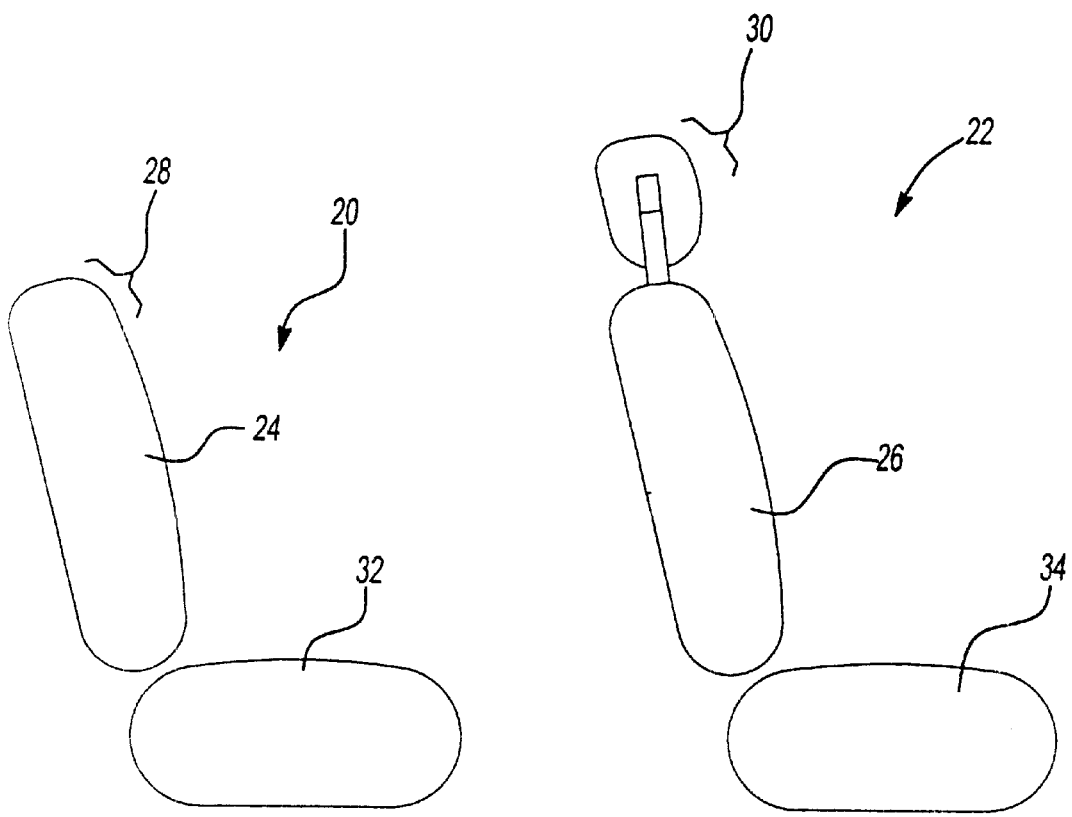
Fig-1
Fig-2A   Fig-2B

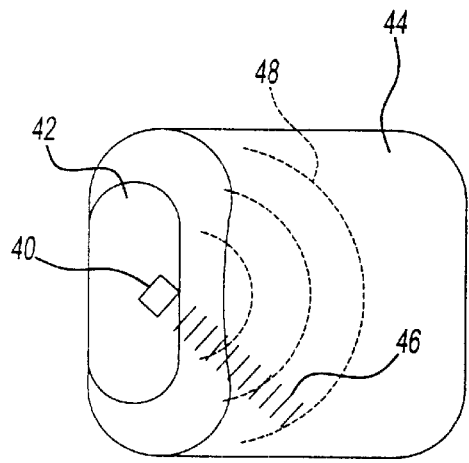
Fig-3A
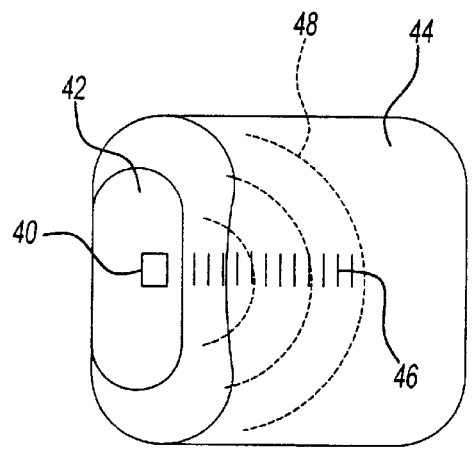
Fig-3B
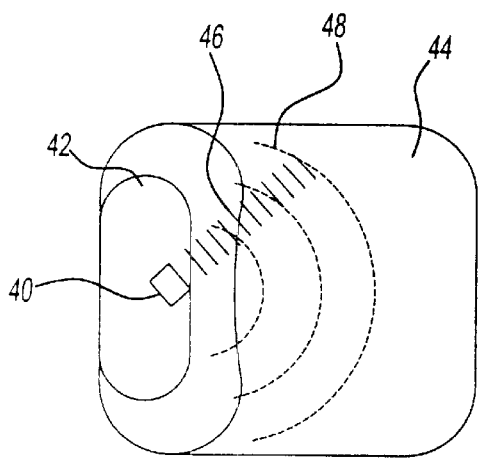
Fig-3C
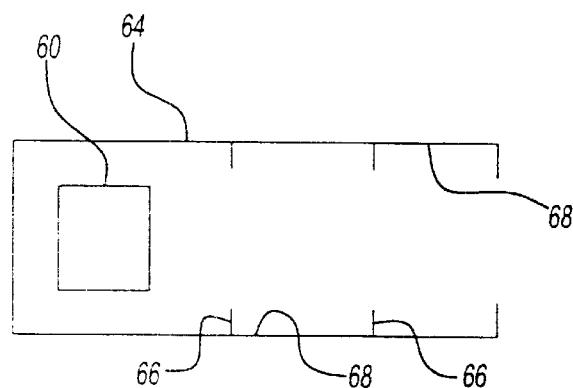 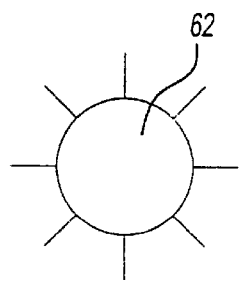
Fig-4

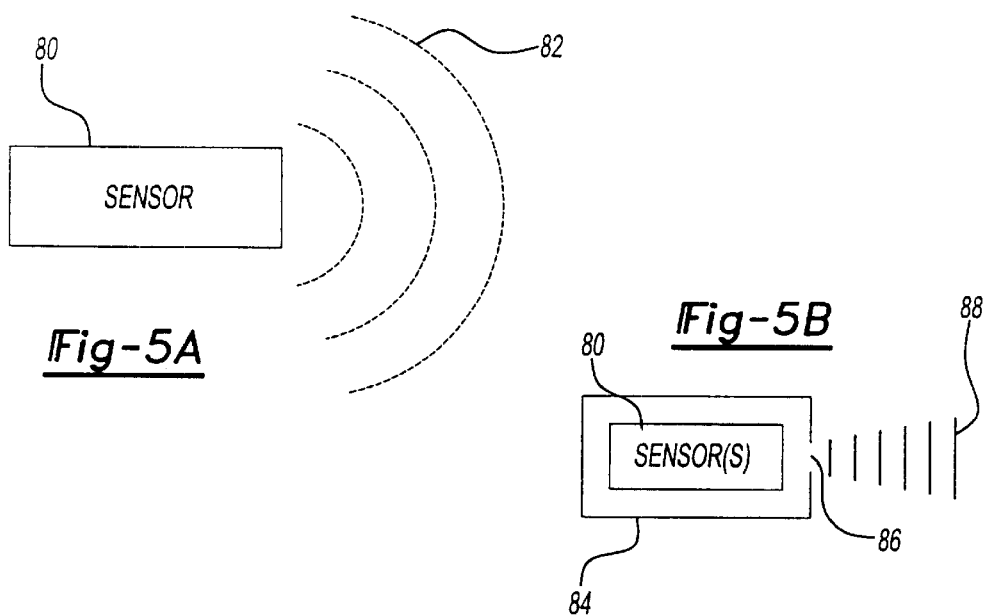
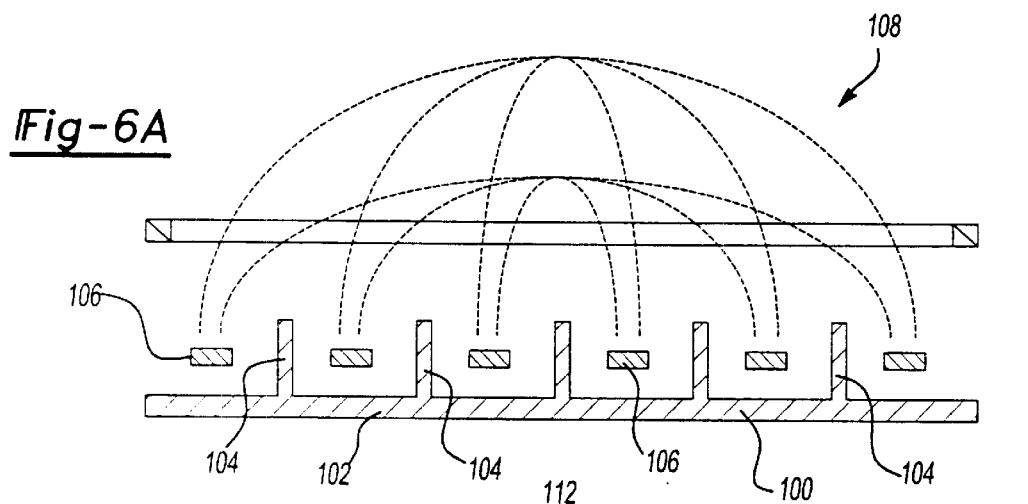
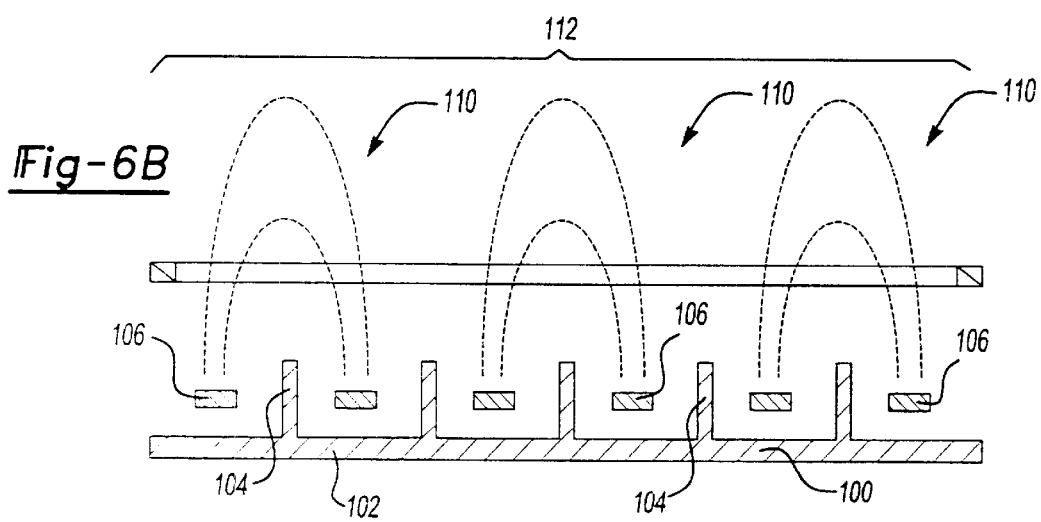

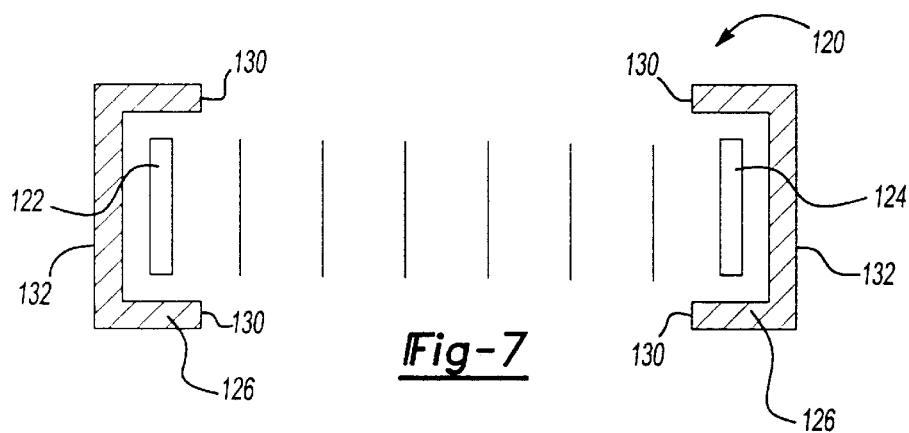
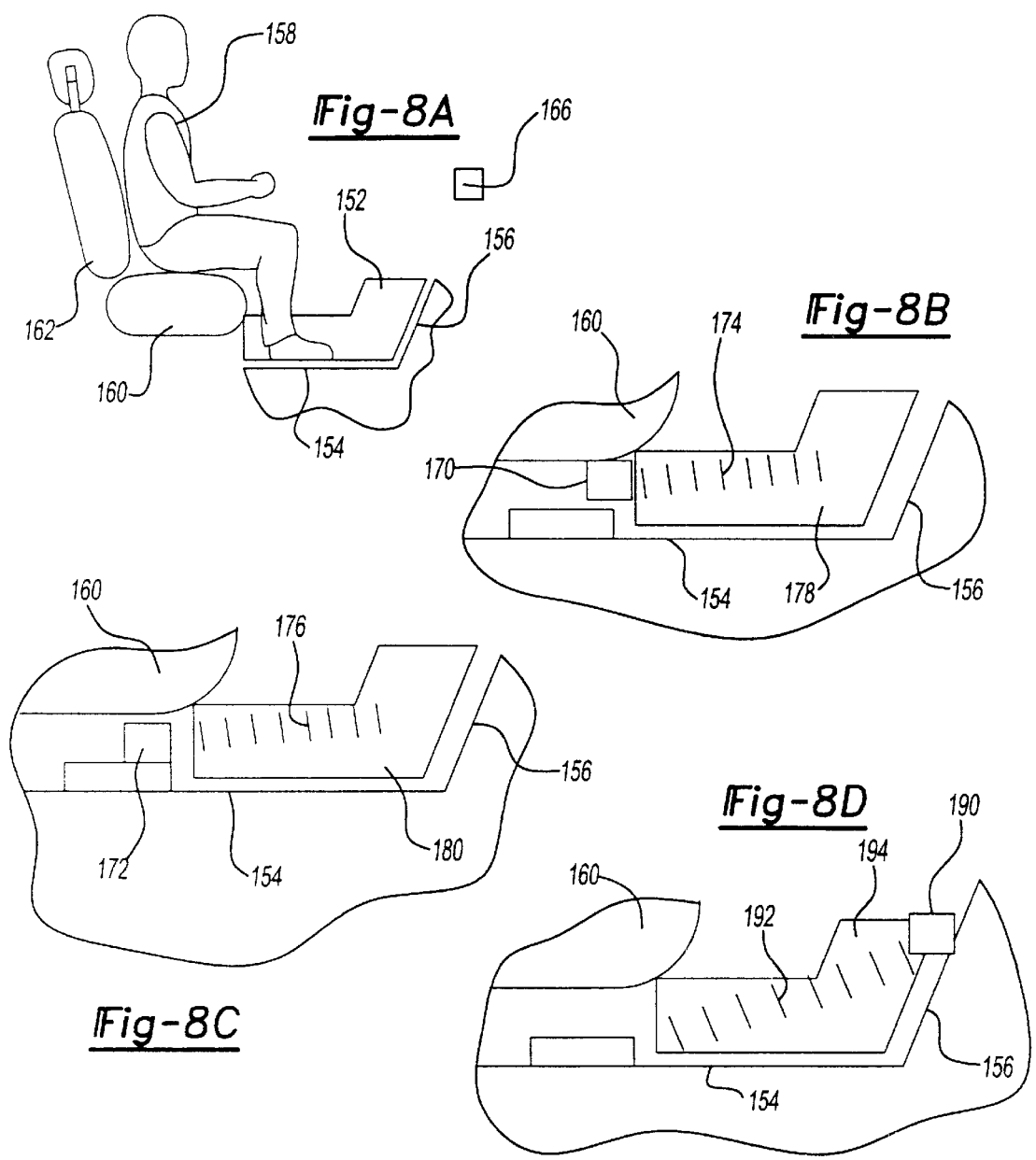

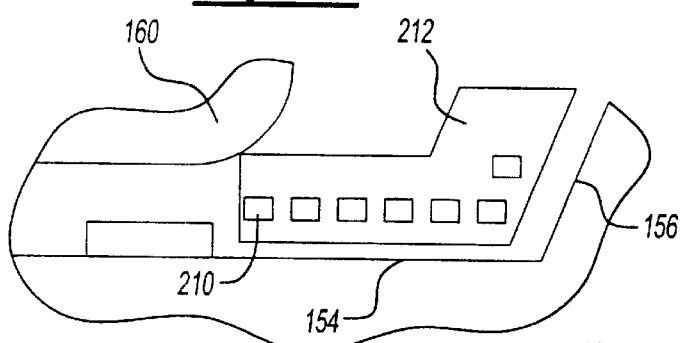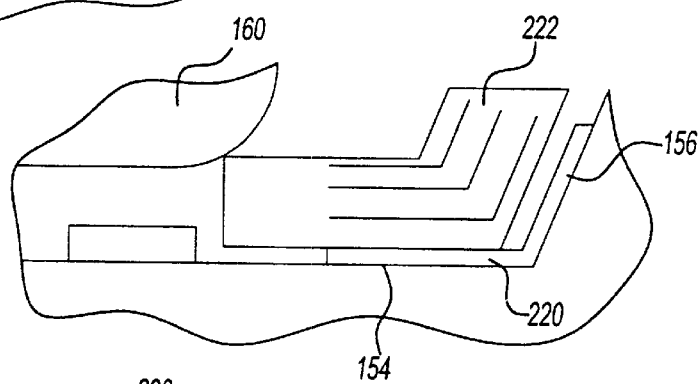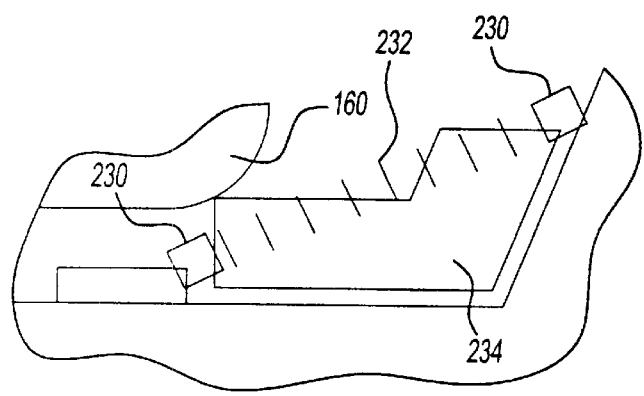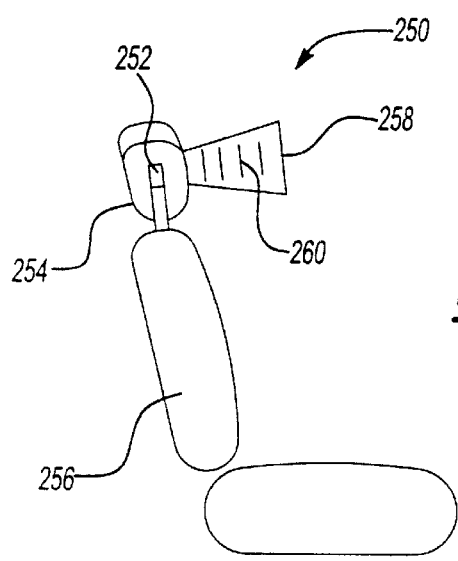

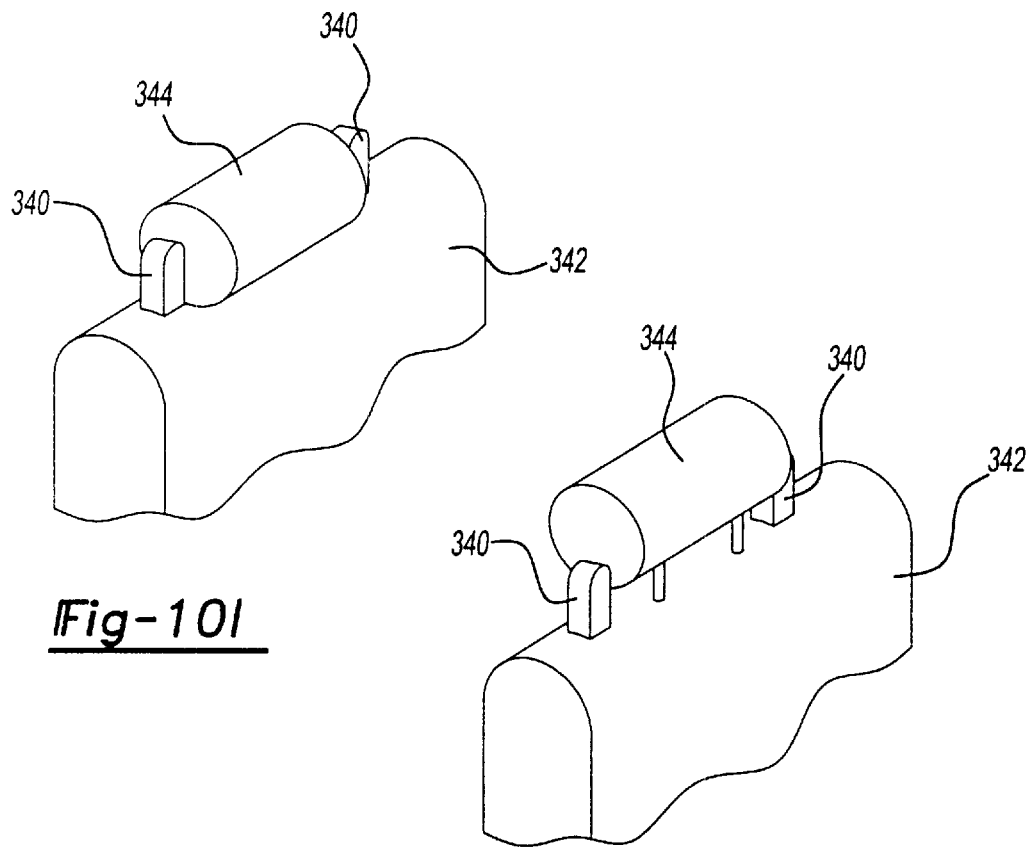
Fig-10I
Fig-10J
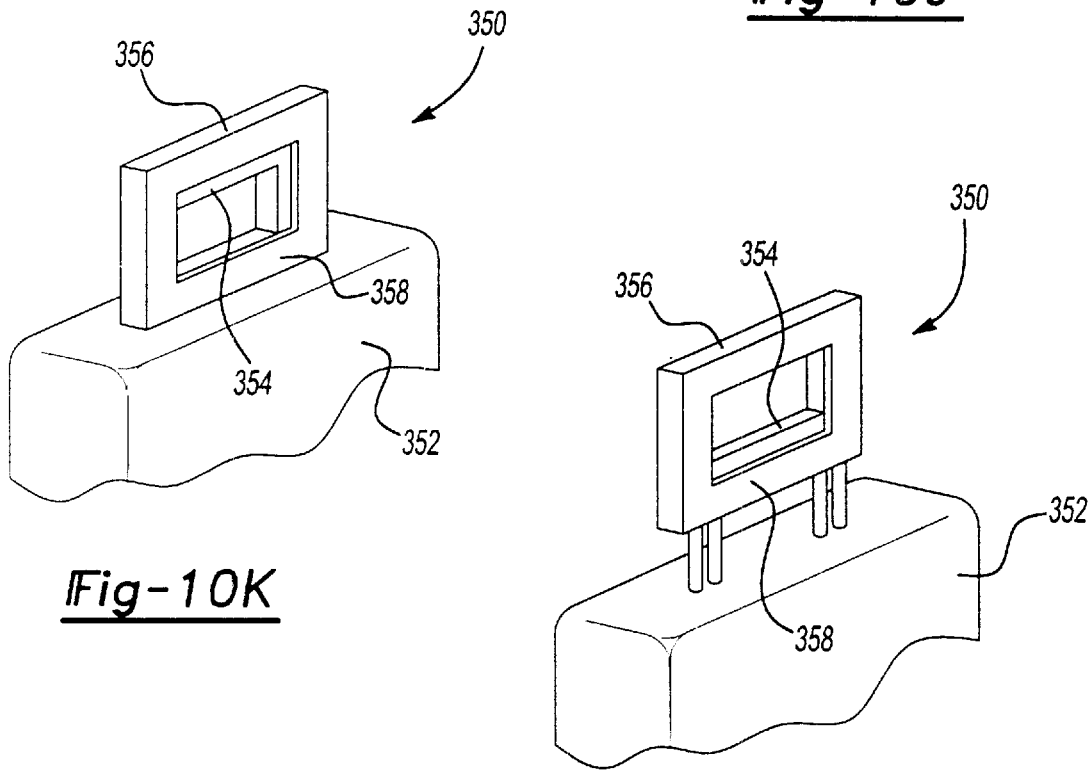
Fig-10K
Fig-10L

| SEAT POSITION SWITCH RESPONSE | SENSOR / SENSOR ARRAY A RESPONSE | RESULTING AIR BAG / PRETENSIONER STATE | ENABLED AIR BAG OUTPUT LEVELS |
|---|---|---|---|
| SEAT IN FORWARD 1/3 OF TRAVEL | OBJECT DETECTED WITHIN 8" OF SENSOR | DEPLOYMENT ENABLED | LOW LEVEL ONLY |
| SEAT IN FORWARD 1/3 OF TRAVEL | OBJECT DETECTED BEYOND 8" OF SENSOR | DEPLOYMENT SUPPRESSED | — |
| SEAT IN FORWARD 1/3 OF TRAVEL | OBJECT NOT DETECTED | DEPLOYMENT SUPPRESSED | — |
| SEAT IN REARWARD 2/3 OF TRAVEL | OBJECT DETECTED WITHIN 8" OF SENSOR | DEPLOYMENT ENABLED | LOW LEVEL OR HIGH LEVEL |
| SEAT IN REARWARD 2/3 OF TRAVEL | OBJECT DETECTED BETWEEN 8" AND 16" OF SENSOR | DEPLOYMENT ENABLED | LOW LEVEL ONLY |
| SEAT IN REARWARD 2/3 OF TRAVEL | OBJECT DETECTED BEYOND 16" OF SENSOR | DEPLOYMENT SUPPRESSED | — |
| SEAT IN REARWARD 2/3 OF TRAVEL | OBJECT NOT DETECTED | DEPLOYMENT SUPPRESSED | — |

AUTOMOTIVE VEHICLE SENSING SYSTEM FOR SELECTIVE AIR BAG DEPLOYMENT

TECHNICAL FIELD

The present invention relates to an internal vehicle sensing system for assisting in controlling deployment of an air bag.

BACKGROUND OF THE INVENTION

Air bag systems are relatively common in automotive vehicles. The systems frequently include an air bag that is deployed in front of or otherwise near a chosen driver or passenger seat within the vehicle upon receipt of a triggering signal. The triggering signal may be supplied electrically or otherwise and is often sent when the vehicle makes significant contact with another object or when the vehicle experiences a sudden deceleration or other like sudden change of condition. Depending on the circumstances existing when the triggering signal is sent, it may be desirable to fully or partially suppress deployment of the air bag or to have full deployment of the air bag. Of particular interest to the present invention are the circumstances existing within the vehicle at the time of a potential air bag deployment such as the position of individuals within the vehicle.

SUMMARY OF THE INVENTION

The present invention is premised upon controlling air bag deployment based upon conditions or circumstances existing within a vehicle at the time of potential air bag deployment.

Accordingly, there is disclosed a vehicle sensing system near a seat for assisting in the selective deployment of an air bag. The seat includes a buttocks supporting portion, a torso supporting portion and a head supporting portion. A first sensor is placed adjacent to a footwell for detecting the lower extremities of an individual sitting in an upright position in the seat. The footwell is located in front of and at least partially below the buttocks supporting portion of the seat. A second sensor is placed adjacent the head supporting portion of the seat for detecting the bust of the individual sitting in an upright position. The first and second sensors are in communication with an air bag system including the air bag. The first and second sensors are capable of sending signals to the air bag system depending on whether the first and second sensors detect objects at various proximities and the signals assist in controlling the degree of any deployment of the air bag.

There is disclosed a vehicle sensing system near a seat for assisting in the selective deployment of an air bag. First and second sensors are in communication with an air bag system including the air bag. The first and second sensors are configured to signal the air bag system such that any deployment of the air bag may be substantially full deployment if both the first and second sensor detect an object within their respective arrays and any deployment of the air bag is at least partially suppressed if at least one of the first and second sensors lacks detection of an object within its respective array.

There is further disclosed a vehicle sensing system near a seat for assisting in the selective deployment of an air bag which includes a transmitting unit for forming a transmitting array adjacent the transmitting unit. There is a receiving unit for forming a receiving array adjacent the receiving unit. One of the units is placed adjacent a footwell for positioning its respective array within the footwell, wherein the footwell is located in front of and at least partially below the buttocks supporting portion of the seat. One of the units is placed adjacent the head supporting portion of the seat for forming its respective array adjacent the head supporting portion. The receiving and transmitting units are in communication with an air bag system for assisting in controlling deployment of the air bag. The receiving and transmitting units allow full deployment of the air bag if the receiving unit receives a signal from the transmitting unit. The receiving unit only receives the signal from the transmitting unit if an object is present within the transmitting array and the receiving array as a connection for the signal to travel through.

These and other objects, aspects, and advantages of the present invention will become apparent upon reading the following detailed description in combination with the accompanying drawings.

BRIEF DESCRIPTION OF THE DRAWINGS

FIG. 1 illustrates a side view of an individual.

FIGS. 2(a) and 2(b) illustrate side views of seats for an automotive vehicle.

FIGS. 3(a)–3(c) illustrate top views of a sensor adjacent a headrest of an automotive seat.

FIG. 4 illustrates a side sectional view of a shielded sensor.

FIGS. 5(a) and 5(b) respectively illustrate side sectional views of an unshielded sensor and a shielded sensor.

FIGS. 6(a) and 6(b) illustrate side sectional views of receiving and transmitting units of sensors.

FIG. 7 illustrates a side sectional view of opposing shielded receiving and transmitting units of a sensor.

FIG. 8(a) illustrates a side view of a sensing system.

FIGS. 8(b)–8(g) illustrate alternative embodiments of sensors suitable for the sensing system shown in FIG. 8(a).

FIG. 9 illustrates a side view of a sensing system.

FIG. 21 illustrates a logic chart for selective deployment of an air bag based upon signals of a sensing system.

DETAILED DESCRIPTION OF PREFERRED EMBODIMENT

Definitions

Figure 10A:
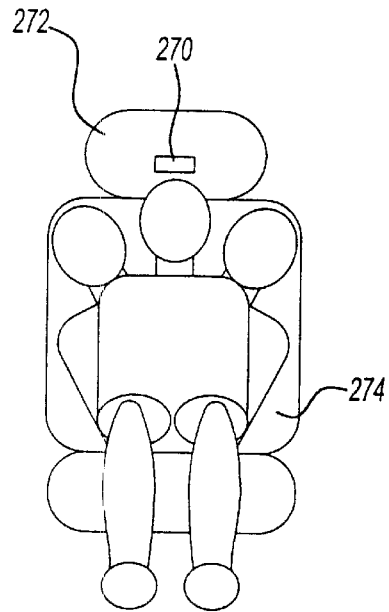
FIGS. 10(a)–10(d) illustrate front views of alternative embodiments of exemplary sensors of the sensing system of FIG. 9.

Bust: A portion of an individual generally including the chest, shoulders, neck and head of the individual. As shown in FIG. 1, the bust generally includes that portion of an individual 10 approximately at or above line 12.

Torso: A portion of an individual generally including the mid to lower back and abdomen of the individual. As shown in FIG. 1, the torso generally includes that portion of the individual 10 approximately between the bust and buttocks (e.g., approximately between lines 12 and 14).

Buttocks: A portion of an individual generally including the buttocks and upper thighs of the individual 10. As shown in FIG. 1, the buttocks generally includes that portion of the individual 10 below the torso and above the lower extremities (e.g., approximately between lines 14 and 16).

Lower Extremities: A portion of an individual generally including the feet, calves and optionally the knees of the individual 10. As shown in FIG. 1, the lower extremities generally includes that portion of the individual approximately at or below line 16.

Torso Supporting Portion: A portion of a vehicle seat designed to support the back or torso of an individual. Referring to FIGS. 2(a) and 2(b) there are shown two seats 20, 22 with torso supporting portions indicated at 24, 26.

Head Supporting Portion: A portion of a vehicle seat adjacent to the head of an individual sitting upright in the seat. The head supporting portion may include a head rest of a seat, the components or members supporting a headrest, or the upper portion of the torso supporting portion of a seat. Referring to FIGS. 2(a) and (b), the seats 20, 22 shown include head supporting portions indicated at 28, 30.

Buttocks Supporting Portion: A portion of a vehicle seat designed to support the buttocks of an individual. Referring to FIGS. 2(a) and (b), the two illustrative embodiments of seats 20, 22 shown include buttocks supporting portions indicated at 32, 34.

Sensor: A device which can detect a condition or object.

Sensor Array: An area including a plurality of locations over which one or more sensors are adapted to detect an object if a condition is met.

The present invention relates to a sensor system for an automotive vehicle wherein the system includes one or more sensors mounted within the vehicle for forming sensor arrays within the vehicle. The sensor arrays formed by the sensors are generally located near a seat or seating location toward which an air bag is to deploy to detect objects present within the arrays. The sensors that form the sensor arrays in the vehicle are referred to herein as in-position sensors. The in-position sensors are in communication with an air bag or air bag system such that the sensors can signal the air bag system based upon whether the sensors are detecting an object in their sensor arrays or another predetermined condition.

The air bag system also is equipped with conventional sensors that detect a condition such as sudden decelerations of the vehicle or vehicle impacts wherein the sensors can selectively trigger the air bag of the air bag system to inflate or deploy when the condition is sensed. Such sensors of air bag systems will be referred to herein as trigger sensors, which may be part of trigger systems. Examples of trigger sensors include accelerometers, contact sensing devices, impact sensors and the like.

The trigger sensors of the air bag system and the in-position sensors of the sensing system are preferably in communication with a controller that can command responses of the air bag based upon signals sent by the sensors. The in-position sensors may command the air bag whether or not to respond to signals received by the trigger sensors (e.g., whether to suppress or enable the deployment of an air bag). As an example, an accelerometer may experience a sudden deceleration of an automotive vehicle and send a signal to the controller commanding deployment of an air bag. However, an in-position sensor may send a signal to the controller suppressing or partially suppressing deployment of the air bag if the in-position sensor does not sense the presence of an object (e.g., an individual) within its sensor array. In that case, the controller may be programmed to accept or act upon the signal from the accelerometer only if the in-position sensor is also signaling for deployment. Thus, deployment of the air bag will be suppressed. Additionally, the in-position sensors may send signals to determine whether an air bag system will fully or only partially deploy an air bag.

Thus, the combination of position sensors and trigger sensors may provide at least two possible signals when the trigger condition is met 1) in position/trigger deploy to state 1, and 2) out-of-position/trigger deploy to state 2 (or do not deploy at all). Depending upon which outcome is signaled, the airbag will be suitably deployed.

The controller, the sensors or both may be programmed to include logic such as "fuzzy" logic to determine overall sensor array/sensor location responses.

The Sensors

Numerous technologies may be used for the in-position sensors, including capacitive sensors, imbedded or non-imbedded ultra sonic sensors, dynamic or passive infra-red sensors, fiber optic sensing systems, vision systems, radar systems, weight pads, load cells, magnetic field sensing systems which may optionally include inductors and other suitable technologies. In-position sensors may have static or pseudo-dynamic response times. In-position sensors may be pulsed or phased to minimize interference. In-position sensors may be arranged in laterally, vertically or horizontally adjacent position with respect to each other in order to form effective sensor arrays. In-position sensors may have variable detection distances, which may be based upon seat position or other factors. Furthermore, in-position sensors may command varied output levels for the air bag wherein the output levels are controlled by an air bag system. Exemplary air bag systems having variable output levels are disclosed in commonly owned copending applications Ser. Nos. 09/817,767 and 09/817,784, both titled "Automotive Vehicle Air Bag System" and filed on Mar. 26, 2001, both of which are hereby fully incorporated by reference. Further yet, a sensor may be used to determine whether a seat belt for a given seat is in use which may also affect the manner of air bag deployment or whether the air bag is deployed. In certain embodiments, sensors can sense through or beyond materials such as foam, cloth and leather. Such sensors may be nearly or substantially embedded within portions of an automotive vehicle seat or other vehicle portions.

Sensors or portions thereof may be rotating or translating or otherwise moving to form arrays with a variety of configurations such as partial circular, partial spherical, rectangular or other shape. Referring to FIGS. 3(a)–3(c), there is illustrated a sensor 40 mounted upon a headrest 42 of a vehicle seat 44 wherein the sensor 40 rotates and emits a signal 46 to form a sensor array 48 having a partial circular or partial spherical shape.

In certain circumstances, it may be advantageous to shield a sensor such as an infrared sensor from environmental conditions which may cause interference, including, sunlight, shadows, dust, adjacent sensors or other potential interference. A shield may also be advantageous for controlling or directing signals as they are emitted from sensors. Referring to FIG. 4, there is illustrated a shielded sensor 60, wherein, the detection or sensing ability of the sensor 60 may be blinded by direct or reflected sunlight from the sun 62. Therefore, the sensor 60 has been disposed in a housing 64 to protect the sensor 60 from direct sunlight. Optionally, the housing 64 may include one or more protrusions 66 positioned internally within the housing 64 or may include non-reflective inner surfaces 68 to limit reflected sunlight.

Referring to FIGS. 5(a)–5(b), there is illustrated a capacitive sensor 80. In FIG. 5(a), the capacitive sensor 80 is unshielded and emits a signal 82 having a partial circular or partial spherical shape which may be desired in some circumstances. However, it may also be desirable to shield such a sensor 80 in other circumstances. In FIG. 5(b), the sensor 80 is surrounded by a shielding member 84 having an opening 86. The member 84 substantially prohibits the release of signals outside the member 84 with the exception of the signal 88 emitted from the opening 86 in the member 84. The size and shape of the opening 86 may be altered to vary the amount and shape of the signal 88 emitted from the shielding member 84. For example, the opening 86 may be a slot to form a generally planar signal or a circle to form a cylindrical or frusto-conical signal or other suitable shape to form other desired signals.

Referring to FIGS. 6(a)–7, shields may be applied to sensors having sending and receiving units that are both on one side of a sensor array or on opposing sides of a sensor array.

In FIGS. 6(a) and 6(b), there is illustrated a shielding member or housing 100 that includes a generally planar member 102 and five partitions 104 extending from the planar member 102. The five partitions 104 separate six units 106, three transmitting units 106 and three receiving units 106 that are paired to form three sensors. The transmitting and receiving units 106 may be paired with each other in a variety of manners to form sensors and sensor arrays. For example, in FIG. 6(a), the outermost units 106, the innermost units 106 and the remaining two intermediate units 106 are paired to form sensors which emit signals to form a sensor array 108 that is partial circular or partial spherical shape. In FIG. 6(b), each of the pairs of units 106 or sensors is separated by only one partition 104 such that each pair is next to each other for forming three partially elliptical sensor arrays 110 thereby forming one elongated array 112.

In FIG. 7, there is illustrated a sensor 120 that includes a transmitting unit 122 and a receiving unit 124. The transmitting and receiving units 122, 124 are each shielded by shielding members 126 and the transmitting unit 122 opposes the receiving unit 124. In FIG. 7, the shielding members 126 include one or more side walls 130 that can substantially or partially surround the units 122, 124 and a back wall 132 which interconnects the side wall[s] 130.

Sensor and Sensor Array Locations

The sensing system for the present invention may include one or more sensors located upon or near a vehicle seat wherein the sensors form sensor arrays to detect objects within those arrays. The locations of such sensor arrays may be arranged or located in a manner that assists in determining what objects are located near or upon the seat to assist in determining what degree, if any, of air bag deployment is desired. For example, it may be desirable to fully deploy an air bag if an individual is seated upright in a vehicle seat. Therefore, one or more sensor arrays may be formed in areas that an upright seated individual is likely to be located. Such areas may include areas near a head supporting portion of a seat, areas near a torso or buttocks supporting portion of a seat or areas in the footwells of the vehicle where an individual in an upright position might likely have their lower extremities. The sensors may send consistent signals to the controller of the air bag system to suppress the deployment of the air bag system unless the upper and lower extremities of an individual are sensed.

Referring to FIG. 8(a), there is illustrated a vehicle sensing system having an in-position sensor array 152 located in the footwell of the vehicle adjacent the floorboards 154 and toe-pan 156 of the vehicle to sense whether the lower extremities of an individual 158 are present within the array 152. Generally, such an array 152 is located forward of and slightly lower than a buttocks supporting portion 160 of a vehicle seat 162.

In-position sensors may be placed in a variety of locations or positions to form a sensor array such as the array 152 in FIG. 8(a), and the sensors may be in communication with a controller 166 that can selectively deploy an air bag.

Referring to FIGS. 8(b)–8(c), in-position sensors 170, 172 are placed substantially below the buttocks supporting portion 160 of the seat 162 such that the sensors 170, 172 emit signals 174, 176 to form sensor arrays 178, 180 similar to the array 152 of FIG. 8(a) in the footwell of a vehicle. The sensors 170, 172 may be attached to or near the buttocks supporting portion 160 of the seat 162, the vehicle floorboards 154 or otherwise. Preferably, and as will be true with other signals emitted by sensors of the present invention, the signals 174, 176 are emitted as a plane such that the plane overlays a substantial portion of the floorboards 154 of the vehicle to detect an individual's lower extremities in most any area of the footwell. Advantageously, the sensors 170, 172 may be programmed to send the signals 174, 176 at different distances depending upon the position of the seat 162 (i.e., further signals when the buttocks supporting portion 160 is far from the toe pan 156 and lesser distant signals when the seat 162 is closer to the toe pan 156) as will be further described below. Alternatively, the sensors 170, 172 may be able to sense the toe-pan 156 or another portion of the vehicle and sense when a portion of the signals 174, 176 sent are not traveling all the way to the toe-pan 156 therefore detecting whether an object is present between the sensor and another portion of the vehicle.

Referring to FIG. 8(d), an in-position sensor 190 may be placed or located on or near the toe-pan 156 of the vehicle such that the sensor 190 emits a signal 192 at least partially toward and below the buttocks supporting portion 160 of the seat 162 thereby forming a sensor array 194-similar to the sensor array 152 of FIG. 8(a) in the footwell of the vehicle.

Referring to FIG. 8(e), one or more in-position sensors 210 may be located in other positions or locations upon or adjacent the floorboards 154, toe-pan 156 or sides of the footwells to form a sensor array 212 similar to the sensor array 152 of FIG. 8(a).

Referring to FIG. 8(f), a weight pad or capacitive sensor 220 may be placed on or near the floorboard 154 of the vehicle, the toe-pan 156 of the vehicle or both to form a sensor array 222 similar to the sensor array 152 of FIG. 8(a). Preferably, the in-position sensor 220 is under the carpet of vehicle and is moisture resistant. It shall be appreciated that a weight pad 220 forms the sensor array 222 because most any object in the foot well area of the vehicle would have to rest on the weight pad 220 such that the weight pad 220 has the effect of sensing in the footwell.

Referring to FIG. 8(g), an in-position sensor may include transmitting and receiving units 230 that send a signal 232 across the footwell of the vehicle to form a sensor array 234 between the units 230 that is similar to the sensor array 152 of FIG. 8(a). One of the units 230 is located adjacent to the upper portion of the toe pan 156 while the other unit 230 is located adjacent to the floorboard 154 below the buttocks supporting portion 160 of the seat.

The operation of the sensing systems may be such that the controller of the air bag system will allow or command the air bag to deploy upon the receipt of a signal from a trigger sensor of the air bag system if the in-position sensor detects an object within its sensor arrays. However, if the in-position sensor does not detect an object, the controller of the air bag system will completely or at least partially suppress the deployment of the air bag upon receipt of the signal from a trigger sensor of the air bag system.

Referring to FIG. 9 there is illustrated a vehicle sensing system 250 having a first in-position sensor 252 which may be located within, upon or adjacent a head supporting portion 254 of a vehicle seat 256 for forming a bust sensor array 258 for sensing the bust of an individual. As shown, the sensor 252 is located within a headrest 254 of the seat 256. The sensor 252 emits a signal 260 away from the headrest 254 of the seat to form the bust sensor array 258 in an area in which the bust of an in-position individual is likely to reside when such individual is seated in an upright position in the seat 256.

Referring to FIG. 10(a), there is illustrated a sensor assembly that includes a single in-position sensor 270 mounted upon or within the headrest 272 of a seat 274 for an automotive vehicle for forming a bust sensor array. As shown, the sensor 270 is generally centralized within the headrest 272.

Figure 10B:
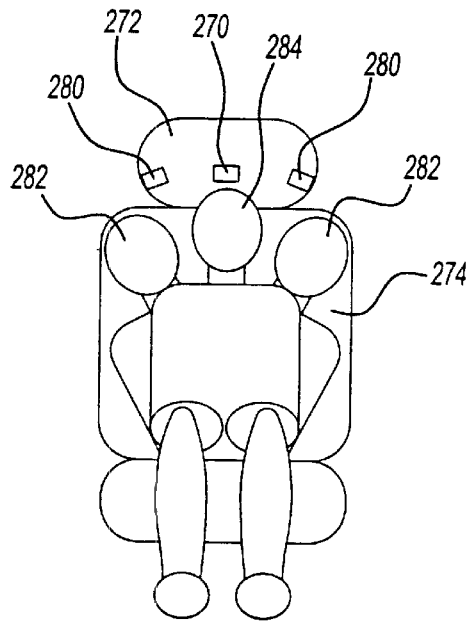

Referring to FIG. 10(b), there is illustrated a sensor system that includes the single centrally located in-position sensor 270 of FIG. 10(a) and additionally includes two sensors 280 mounted within or upon the headrest 272 wherein each sensor 280 is disposed laterally to one side or the other of the center of the headrest 272 and to one side or the other of the centralized in-position sensor 270. Furthermore, the sensors 280 that are disposed laterally away from the center of the headrest 272 may be lower upon the headrest 272 than the centralized sensor 270 for detecting busts of individuals 282 who are laterally off-center within the seat 274. Advantageously, the sensors 280 disposed laterally away from the center can detect lower areas because the individuals 282 who are laterally off-center within the seat 274 are likely to be lower within the seat 274 than a laterally centered individual 284.

Figure 10C:
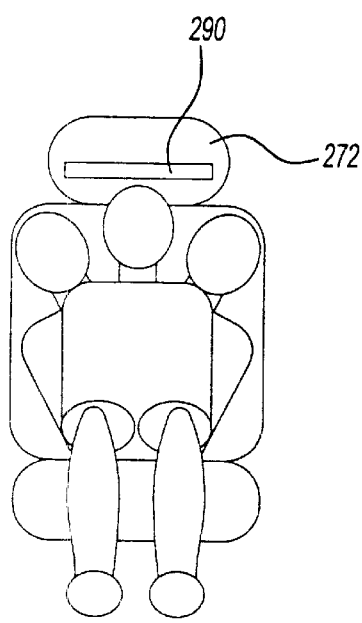

Referring to FIG. 10(c), there is illustrated a sensor 290 having a continuous linear configuration, as the sensor 290 extends laterally across a substantial portion of the headrest 272.

Figure 10D:
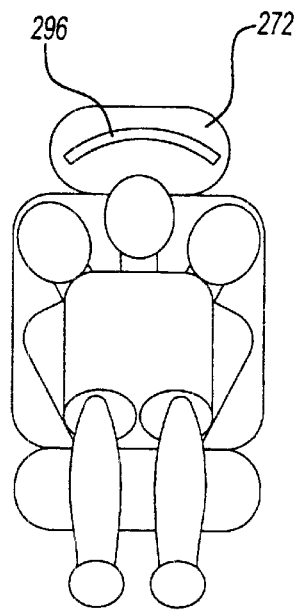

Referring to FIG. 10(d), there is illustrated a sensor 296 having a continuous curved configuration. The sensor 296 extends laterally across a substantial portion of the headrest 272 and is curved such that the sensor 296 is lower and can detect lower further laterally away from the center of the headrest 272.

Figure 10E:
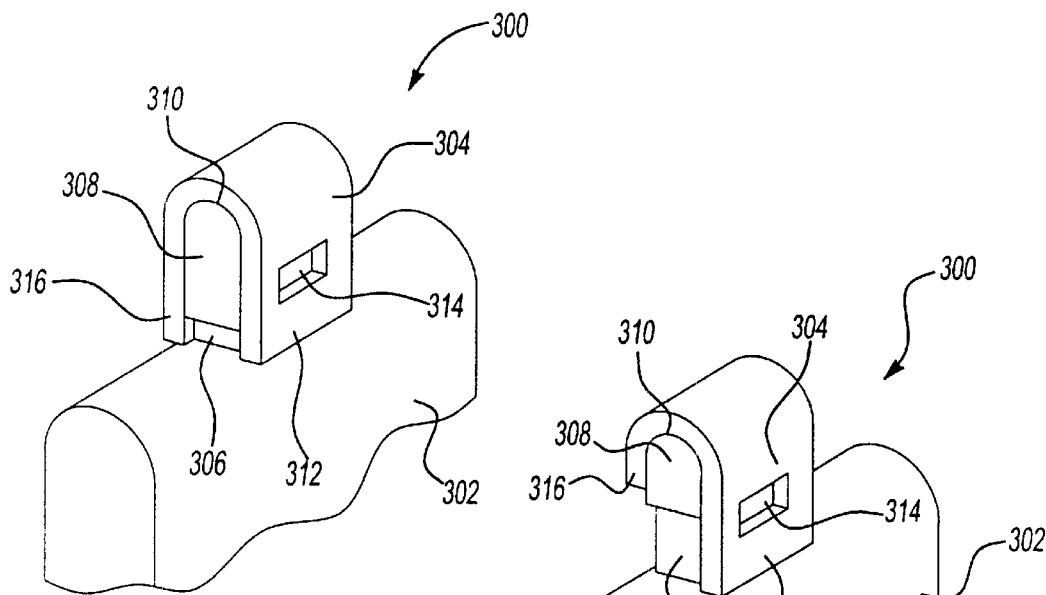
FIGS. 10(e)–10(f) illustrate perspective views of alternative embodiments of exemplary headrest sensor configurations of the sensing system of FIG. 9.
Figure 10F:
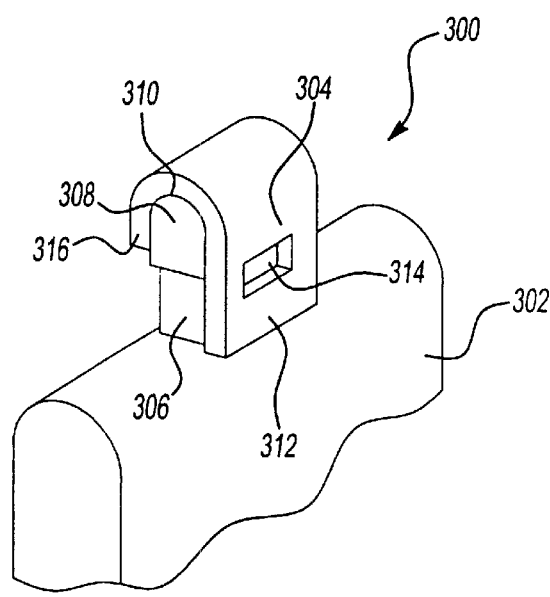

Referring to FIGS. 10(e)–10(f), there is a headrest 300 attached to a torso supporting portion 302 of a vehicle seat. The headrest 300 includes a generally flexible rectangular cushion 304 and a cushion support 306. The cushion support 306 includes a generally rectangular portion 308 that is adjustable such that the portion 308 may be translated toward or away from the torso supporting portion 302. The rectangular portion 308 includes a rounded edge 310 about which the cushion 304 is bent. One end 312 of the cushion 304 is attached to or adjacent the torso supporting portion 302 and that end 312 is designed to remain generally stationary relative to the torso supporting portion 302 and the end 312 includes a sensor 314 mounted within the cushion 304. An opposite end 316 of the cushion 304 is free to move in a vertical direction. As the rectangular portion 308 of the support 306 is raised or lowered, the cushion 304 slides relative to the rectangular portion 308 and the end 316 of the cushion is free to raise and lower with the portion 308.

Figure 10G:
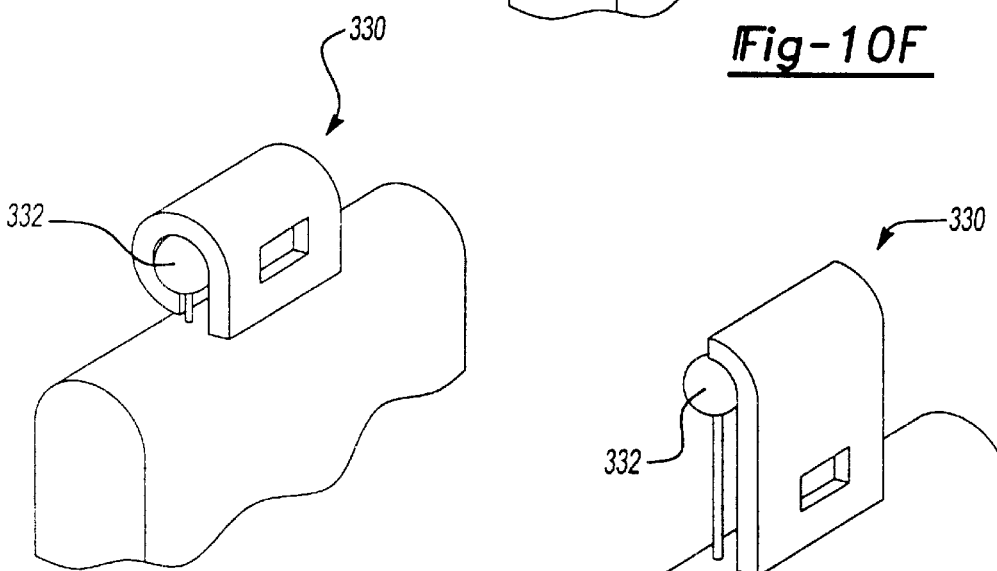
Figure 10H:
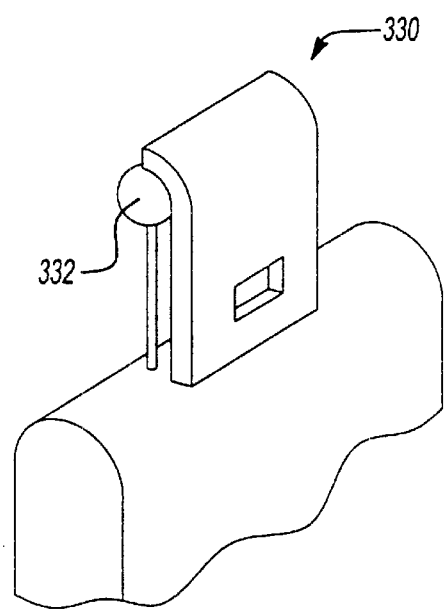

In FIGS. 10(g)–10(h), there is a headrest 330 substantially identical to the headrest of FIGS. 10(e)–10(f) with the exception that the rectangular portion 308 has been replaced with a cylindrical portion 332.

In FIGS. 10(i)–10(j), there is shown a pair of sensors 340 mounted to the top of a torso supporting portion 342 on opposite lateral sides of a headrest 344.

In FIGS. 10(k)–10(l), there is shown a rectangular frame headrest 350 that is adjustable toward and away from a torso supporting portion 352. A generally stationary sensor 354 is supported independently of the headrest 350 such that the sensor 354 is located adjacent a top side 356 of the headrest 350 when the headrest is adjusted substantially toward the torso supporting portion 352 and is located adjacent a bottom side 358 of the headrest 350 when the headrest 350 is adjusted substantially away from the torso supporting portion 352. Each of the sensors 314, 340, 354 may be either exposed or covered with a material such as a cloth.

Figure 11:
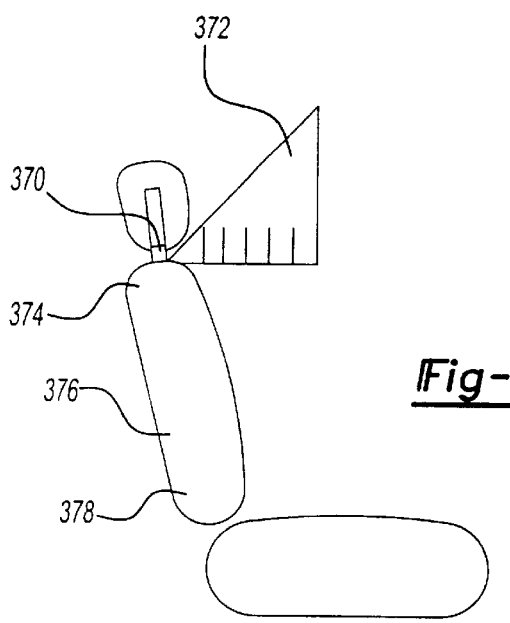
FIG. 11 illustrates a side view of a sensing system.

Referring to FIG. 11, there is illustrated a sensor 370 that forms a bust sensor array 372 wherein the sensor 370 is positioned adjacent an upper end 374 of a torso supporting portion 376 of a vehicle seat 378.

The sensing system may include a sensor mounted upon or adjacent the forward edge or end of the buttocks supporting portion of a seat for sensing either the lower extremities of an individual, the buttocks of an individual or the interface between the buttocks and the lower extremities of the individual.

Figure 12A:
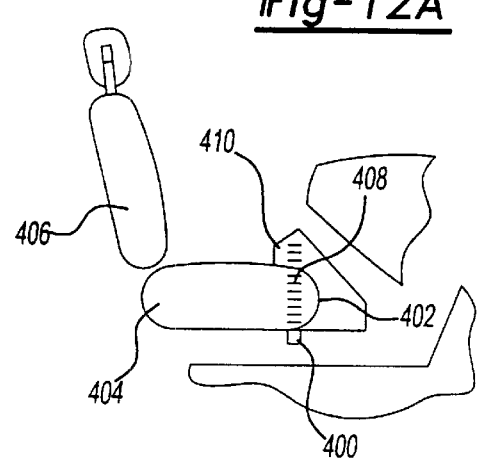
FIGS. 12(a)–12(c) illustrate side views of other sensing systems.

Referring to FIG. 12(a), there is illustrated a sensor 400 mounted adjacent a forward edge or end 402 of a buttocks supporting portion 404 of a vehicle seat 406 for forming a sensor array 410 adjacent the forward end 402. As shown, the sensor 400 is mounted substantially below the buttocks support portion 404 of the seat 406 and emits a signal 408 through the forward end 402 of the seat 406 to form the sensor array 410 to detect objects (e.g., buttocks and/or lower extremities of an individual) adjacent the forward end 402 of the buttocks supporting portion 404.

Figure 12B:
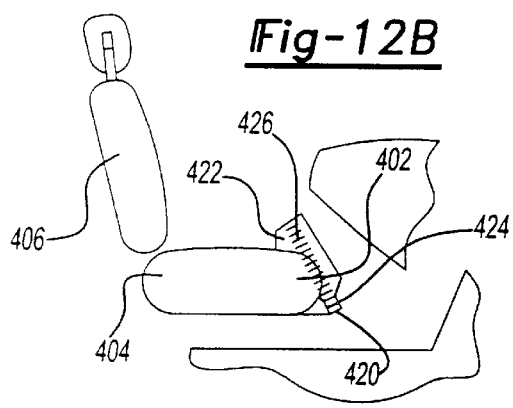

Referring to FIG. 12(b), there is illustrated a sensor 420 mounted adjacent the forward edge or end 402 of the buttocks supporting portion 404 of the vehicle seat 406 forming a sensor array 422 adjacent the forward end 402. As shown, the sensor 420 is mounted upon a lower portion of an outer periphery 424 of the forward edge or end 402 of the buttocks supporting portion 404 of the seat 406 such that the sensor 420 can emit a signal 426 upwards and back toward the buttocks supporting portion 404 of the seat 406 to form the sensor array 422 to detect objects (e.g., buttocks and/or lower extremities of an individual) adjacent the forward end 402 of the buttocks supporting portion 404.

Figure 12C:
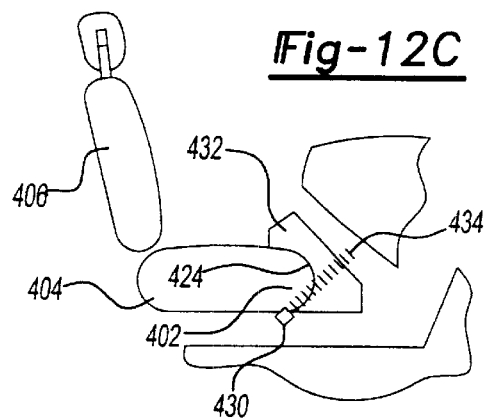

Referring to FIG. 12(c), there is illustrated a sensor 430 mounted adjacent the forward edge or end 402 of the buttocks supporting portion 404 of the vehicle seat 406 forming a sensor array 432 adjacent the forward end 402. As shown, the sensor 430 is mounted upon a lower portion of the outer periphery 424 of the forward edge or end 402 of the buttocks supporting portion 404 of the seat 406 such that the sensor 430 can emit a signal 434 upward and forward away from the buttocks supporting portion 404 of the seat 406 to form the array 432 to detect objects (e.g., buttocks and/or lower extremities of an individual) adjacent the forward end 402 of the buttocks supporting portion 404.

The sensing system may include weight or force in-position sensors that detect weight or force applied to the buttocks or torso supporting portions of an automotive vehicle seat. A weight or force sensor may send a signal to the controller to allow the deployment of the air bag only if a certain amount of weight or force is being applied to the buttocks supporting portion. Alternatively, a sensor may be mounted upon or within a hinge area of the seat that connects the buttocks supporting portion to the torso supporting portion of a seat or be mounted within or upon the torso supporting portion of a seat and either of the sensors may selectively send signals depending upon the weight or force sensed.

Figure 13:
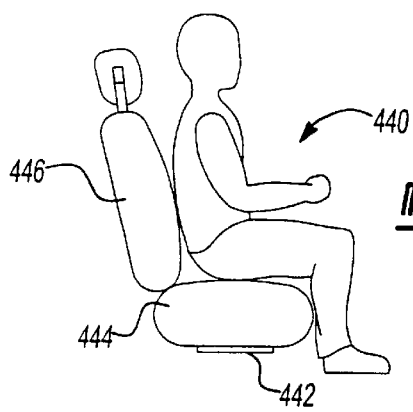
FIG. 13 illustrates a side view of a sensing system.

Referring to FIG. 13, there is illustrated a sensing system 440 having a weight sensor 442 mounted below a buttocks supporting portion 444 of an automotive vehicle seat 446. As shown, the weight sensor 442 may be a weight pad 442 positioned below or within the cushion of the buttocks supporting portion 444 of the seat 446 wherein the weight pad 442 can selectively send signals to the controller of the air bag system based upon the amount of weight sensed by the pad 442. Alternatively, it is possible to mount the weight sensor above the buttocks supporting portion (not shown).

Figure 14:
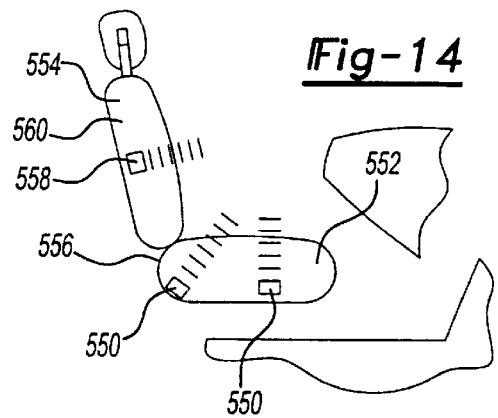
FIG. 14 illustrates a side view of a sensing system.

Referring to FIG. 14, there is illustrated a vehicle sensing system having two sensors 550 mounted within or upon a buttocks supporting portion 552 of a seat 554. One of the sensors 550 is centrally located within the buttocks supporting portion 552 of the seat 554 while the other sensor 550 is located adjacent a back edge 556 of the buttocks supporting portion 552 near the seat hinge area. Both sensors 550 emit signals upwardly to form sensor arrays for sensing the presence of the buttocks of an individual. Also included in the sensing system of FIG. 14 is a sensor 558 mounted within a torso supporting portion 560 of the vehicle seat 554. The sensor 558 is centrally located within the torso supporting portion 560 and emits a signal toward the front of the vehicle for sensing the torso of an individual.

A sensing system may also have a sensor which includes a receiving unit located adjacent one portion of an individual and a transmitting unit located adjacent another portion of an individual wherein the transmitting unit sends a signal (e.g., an electrical signal or sound wave) that translates or is transmitted from the transmitting unit, through at least a portion of an individual and to the receiving unit.

Figure 15A:
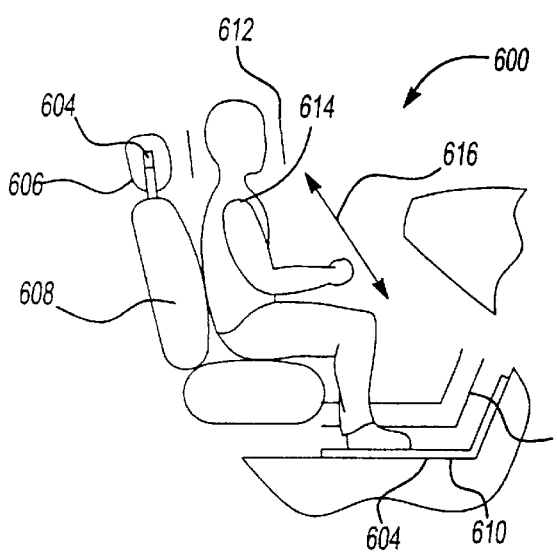
FIGS. 15(a) and 15(b) illustrate side views of sensing system.
Figure 15B:
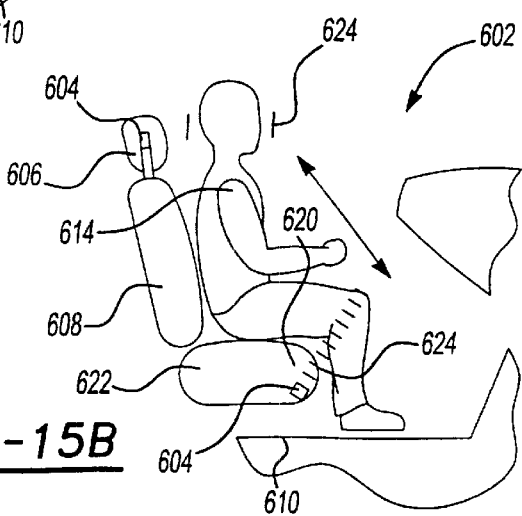

Referring to FIGS. 15(a)–15(b), there are illustrated sensing systems 600, 602 having sensors that include transmitting or receiving units 604. In FIG. 15(a), the sensing system 600 includes a sensor having a transmitting or receiving unit 604 located within a headrest 606 of a seat 608 and a transmitting or receiving unit 604 located within a footwell adjacent a floorboard 610 of the vehicle. One of the transmitting or receiving units 604 forms a transmitting or receiving signal array 612 adjacent the headrest 606 of the seat 608 while the other unit 604 forms a transmitting or receiving array 612 within the footwell of the vehicle. The receiving unit 604 only receives a signal from the transmitting unit 604 if an object (i.e., an individual) 614 is present as a connection for the signal to travel through as indicated by a double-headed arrow 616.

In FIG. 15(b), the sensing system 602 includes a sensor having a transmitting or receiving unit 604 located within the headrest 606 of the vehicle and a transmitting or receiving unit 604 located adjacent a forward edge 620 of a buttocks supporting portion 622 of the seat 608. As shown, one of the transmitting or receiving units 604 forms a transmitting or receiving array 624 adjacent the headrest 606 of the seat 608 while the other unit 604 forms a transmitting or receiving array 624 near forward end 620 of the buttocks supporting portion 622 of the seat 608 of the vehicle. The receiving unit 604 only receives a signal from the transmitting unit 604 if an object (i.e., the individual) 614 is present as a connection for the signal to travel through.

Sensors used for transmitting or receiving units 604 may be capacitive sensors with plate[s] located near portions of an individual such as an individuals' busts and lower extremities or both. When a transmitting unit emits a short range signal, the human body may conduct that signal to the receiving unit while other objects such as air, the vehicle seat and/or other objects do not have the necessary position to pick up or conductive ability to transfer the signal.

Figure 16A:
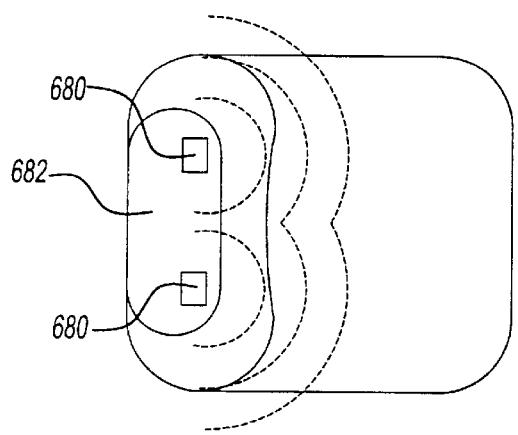
FIG. 16(a) illustrates a top view of a sensor arrangement for a sensing system.
Figure 16B:
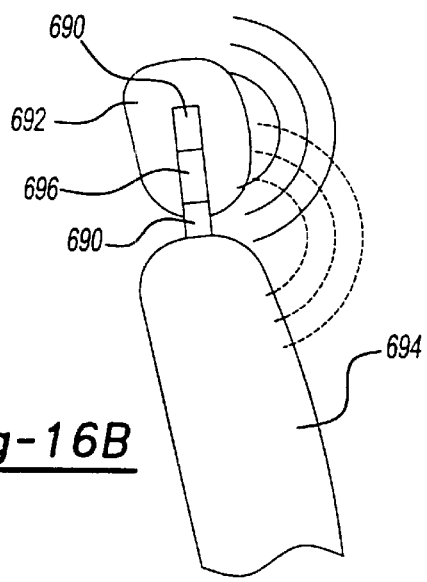
FIG. 16(b) illustrates a side view of a sensor arrangement for a sensing system.

Multiple sensors may be used to form one or more arrays for detecting one portion of an individual, wherein the sensors are spaced laterally or vertically away from each other to form one or more sensor arrays with a broader sensing zone. In FIG. 16(a), there is illustrated a first and second sensor 680 adjacent to each other and laterally spaced apart in a headrest 682 for detecting the bust of an individual. In FIG. 16(b), there is illustrated a first and second sensor 690 adjacent each other and vertically spaced apart wherein one of the sensors 690 is located in a headrest 692 while the other is located in or on a torso supporting portion 694 or headrest support 696.

Sensor and Sensor Array Combinations

The in-position sensors described above may be combined to form further sensor systems. One or more of the in-position sensors or sensor systems described above may be in communication with a controller along with one or more trigger sensors wherein the controller will selectively deploy an air bag based upon the signals received by the trigger sensors, the in-position sensors or both. The controller may be programmed such that it must receive a signal of detection (e.g., a signal that the presence of an object is sensed) from at least one and possibly all in-position sensors or sensor arrays before the controller will respond to a signal from a trigger sensor commanding deployment of an air bag. Alternatively, the controller or sensors may trigger different levels of deployment of the air bag based upon signals received from the in-position sensors, the triggering sensors or both.

The sensing systems below will be described in terms of combinations of sensor arrays, however, the person of skill in the art will understand that the arrays may be formed by the sensors discussed above.

Figure 17:
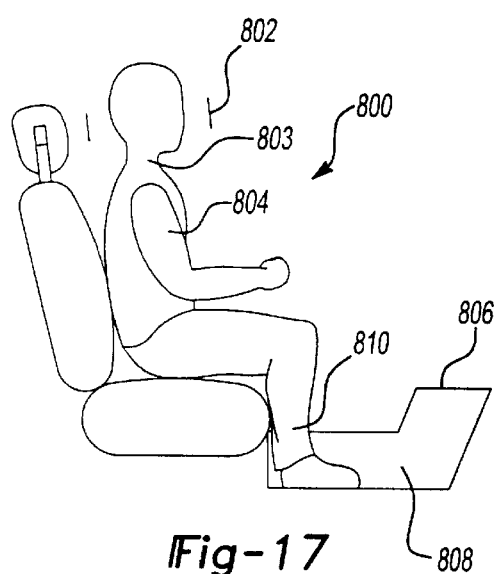
FIG. 17 illustrates a side view of a sensing system.

Referring to FIG. 17, there is illustrated a sensor system 800 that includes a bust sensor array 802 for sensing a bust 803 of an individual 804 in an upright position in combination with a sensor array 806 in the footwell 808 of a vehicle for sensing the lower extremities 810 of the individual 804.

Figure 18:
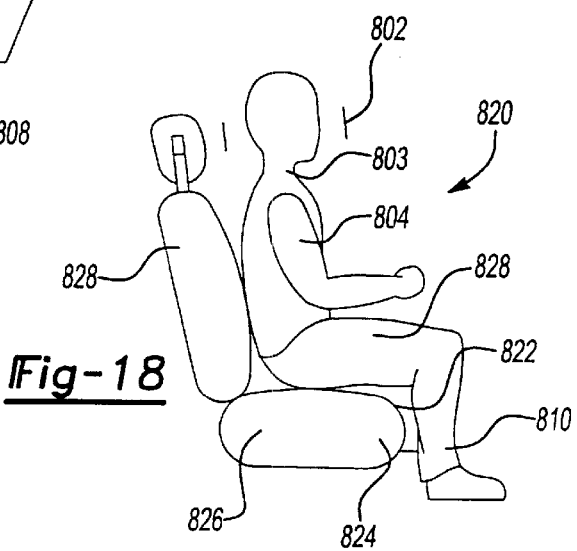
FIG. 18 illustrates a side view of a sensing system.

Referring to FIG. 18, there is illustrated a sensor system 820 that includes the bust sensor array 802 for sensing the bust 803 of the individual 804 in combination with a sensor array 822 adjacent a forward end 824 of a buttocks supporting portion 826 of a vehicle seat 828 for sensing the lower extremities 810 of the individual 804, the buttocks 828 of the individual 804 or both.

Figure 19:
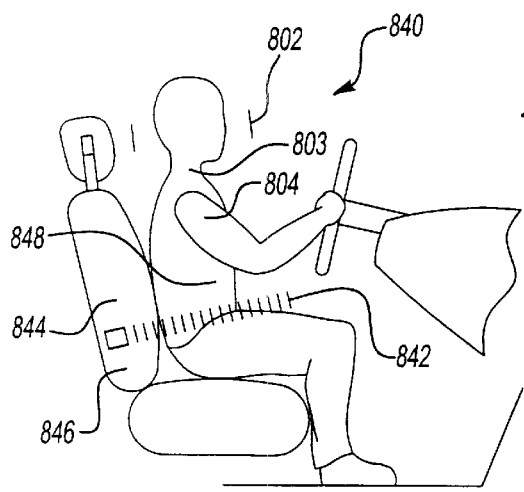
FIG. 19 illustrates a side view of a sensing system.

Referring to FIG. 19, there is illustrated a sensor system 840 that includes the bust sensor array 802 for sensing the bust 803 of the individual 804 in combination with a sensor array 842 adjacent a torso supporting portion 844 of a vehicle seat 846 for sensing the presence of a torso 848 of the individual 804. The system 840 of FIG. 19 is applied to a driver seat 846, however, it may also be applied to other seats as well.

A variety of other combinations of sensor arrays may form sensor systems and such combinations may be utilized to detect nearly any part of an individual.

Figure 20:
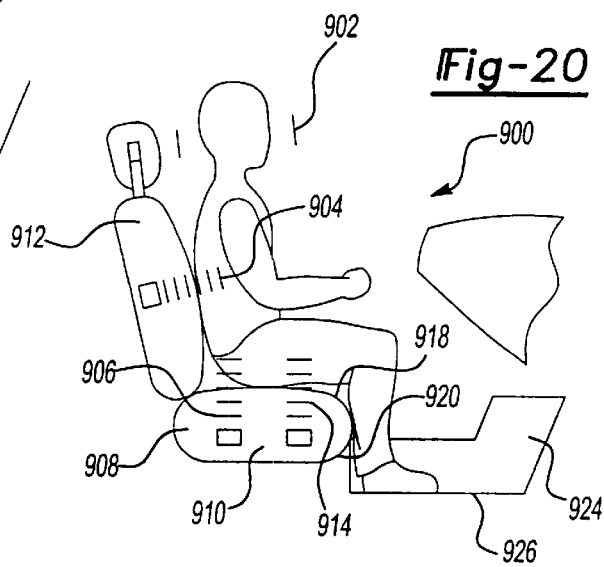
FIG. 20 illustrates a side view of a sensing system.

Referring to FIG. 20, there is illustrated a sensing system 900 that includes a bust sensor array 902, a torso sensor array 904, a buttocks sensor array 906 positioned adjacent a rearward end 908 of a buttocks supporting portion 910 of a seat 912, a buttocks sensor array 914 emitted outward from a central portion of a buttocks supporting portion 910 of the seat 912, an array 918 adjacent a forward end 920 of the buttocks supporting portion 910 and an array 924 in a footwell 926 of a vehicle. The person of skill in the art will recognize that any two or more of the above arrays 902, 904, 906, 914, 918, 924 may be combined to form a sensing system. The person of skill in the art shall recognize that the systems 800, 820, 840, 900 of FIGS. 17–20 and variations thereof may send signals in a variety of manners to assist in determining the degree of any deployment of an air bag. The sensor systems 800, 820, 840, 900 may send continuous signals instructing air bag suppression unless the systems 800, 820, 840, 900 sense objects (e.g., individuals) within the respective arrays of the systems 800, 820, 840, 900, and upon detection of such objects signals of enablement are sent. Alternatively, the air bag system may only deploy an air bag if the sensor systems 800, 820, 840, 900 send deployment signals such that suppression signals need not be sent or the sensing systems 800, 820, 840, 900 may only send suppression signals when they do not sense objects such that the air bag will automatically deploy if triggered to deploy unless the sensor systems 800, 820, 840, 900 signal suppression.

In other alternative embodiments, the sensing system may include a seat position sensor for assisting in controlling the deployment of an air bag. In certain situations, it may be more desirable to have the selective deployment of the air bag depend upon the distance an object (i.e., an individual) is from the sensor or depend upon the for/aft positioning of the seat into which the air bag deploys. It may be desirable to have an air bag deploy at a lesser output when an individual is further from the sensor (e.g., closer to the dashboard or air bag) since the seat is positioned closer to the dashboard.

A seat may be mounted within an automotive vehicle in a manner that allows the seat to be moved forward and rearward within the vehicle and sensors may be used to determine the position of the seat. The vehicle seat may be translatably mounted upon tracks to move the seat forward and rearward and the sensing system may include one or more switches mounted on the tracks so as to divide the track into discrete sections. For example, a first and second switch mounted on the tracks divide one or more of the tracks into thirds such that when the seat moves between the thirds of the track, the sensor signals the controller of the air bag system or both as to what third of travel the seat is in. The seat may also translate in an up and down direction which may be sensed by a seat sensor to detect the seat position. One or more of the sensors from FIGS. 1–20 may also be included to detect the position of the seat by measuring the distance to a vehicle interior surface.

Referring to FIG. 21, there is illustrated a chart of exemplary logic which may be used for a controller receiving signals from a sensing system that includes seat position sensors and a sensor that forms a bust sensor array. In this example, two seat track switches are used to divide the track into thirds. As can be seen, deployment may be enabled, suppressed or the level of output of deployment may be changed depending on whether the seat is in the front third, middle third or rear third of travel and depending on the distance from the bust sensor that an object is detected.

Figure 22A:
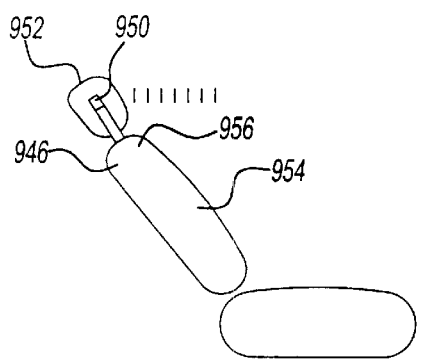
FIGS. 22 (a)–22(d) illustrate side views of sensing systems.
Figure 22C:
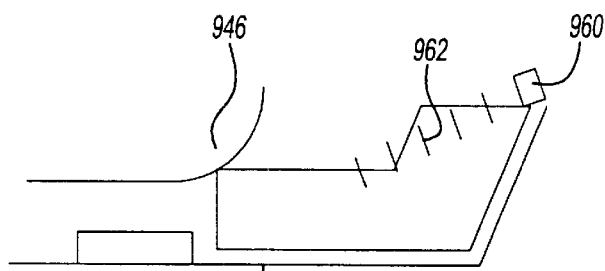
Figure 22B:
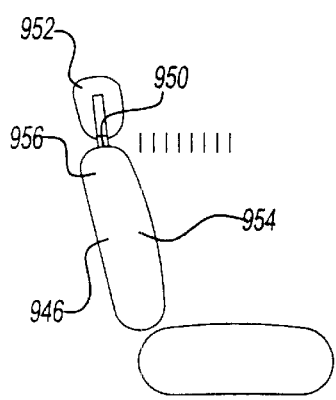
Figure 22D:
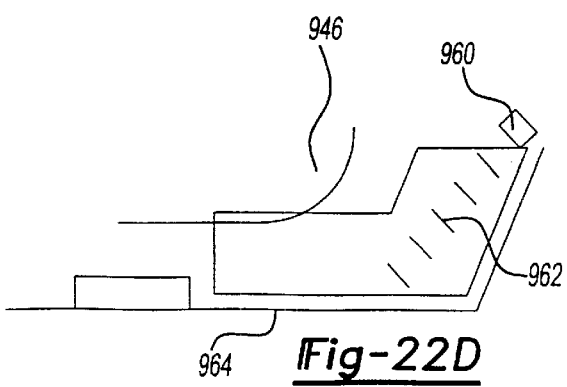

In still other alternative embodiments, sensors may translate or rotate to compensate for relative movements of a seat in the vehicle. Referring to FIG. 22(a), there is illustrated a sensor 950, that at least partially vertically translates and rotates depending on the positioning of the torso or head supporting portion of a seat 946. The sensor 950 is adjacent or within headrest 952 of the seat 946 when the torso supporting portion 954 and the headrest 952 are reclined and the sensor 950 is adjacent or within an upper portion 956 of the torso supporting portion 954 of the seat 946 when the torso supporting portion 954 and the headrest are in an upright position. Referring to FIG. 22(b), there is illustrated a sensor 960 that rotates depending upon the fore/aft position of the seat 946. In the embodiment disclosed, the sensor 960 rotates to emit a signal 962 more downwardly toward a floorboard 964 when the seat 946 is in the forward position as opposed to the aft position.

It should be understood that the invention is not limited to the exact embodiment or construction which has been illustrated and described but that various changes may be made without departing from the spirit and the scope of the invention.

What is claimed is:

1. A vehicle sensing system for assisting in the selective deployment of an air bag near a seat, said seat including a buttocks supporting portion, a torso supporting portion and a head supporting portion, said vehicle sensing system comprising:

a first sensor placed adjacent to a footwell for detecting the lower extremities of an individual sitting in an upright position in said seat, said footwell located in front of and at least partially below said buttocks supporting portion of said seat;

a second sensor placed adjacent said head supporting portion of said seat for detecting the bust of said individual sitting in an upright position, said first and second sensors in communication with an air bag system including said air bag, said first and second sensors capable of sending signals to said air bag system depending on whether said first and second sensors detect objects, said signals assisting in controlling the degree of any deployment of said air bag;

wherein at least one of said first and second sensors rotates and emits a signal to form a sensor array having at least a partial circular shape.

2. A vehicle sensing system for assisting in the selective deployment of an air bag near a seat, said seat including a buttocks supporting portion, a torso supporting portion and a head supporting portion, said vehicle sensing system comprising:

a first sensor placed adjacent to a footwell for detecting the lower extremities of an individual sitting in an upright position in said seat, said footwell located in front of and at least partially below said buttocks supporting portion of said seat;

a second sensor placed adjacent said head supporting portion of said seat for detecting the bust of said individual sitting in an upright position, said first and second sensors in communication with an air bag system including said air bag, said first and second sensors capable of sending signals to said air bag system depending on whether said first and second sensors detect objects, said signals assisting in controlling the degree of any deployment of said air bag; and a controller having air bag deployment logic where in response to adjustments of said seat at least one of said first and second sensors adjusts its field of view and said air bag deployment logic is modified.

3. A vehicle sensing system for assisting in the selective deployment of an air bag near a seat, said seat including a buttocks supporting portion, a torso supporting portion and a head supporting portion, said vehicle sensing system comprising:

a sensor placed adjacent one of at least said head supporting portion and said torso supporting portion of said seat for detecting respectively a bust and a torso of an adult sitting in an upright position, said sensor in communication with an air bag system including said air bag, said sensor capable of sending a signal to said air bag system depending on whether said sensor detects objects, said signal assisting in controlling the degree of any deployment of said air bag;

wherein said sensor extends laterally across a substantial portion of a headrest of said head supporting portion of said seat, said sensor being curved to detect lower further laterally away from a center of said headrest.

4. A vehicle sensing system for assisting in the selective deployment of an air bag near a seat, said seat including a buttocks supporting portion, a torso supporting portion and a head supporting portion, said vehicle sensing system comprising:

a sensor placed adjacent one of at least said head supporting portion and said torso supporting portion of said seat for detecting respectively a bust and a torso of an adult sitting in an upright position, said sensor in communication with an air bag system including said air bag, said sensor capable of sending a signal to said air bag system depending on whether said sensor detects objects, said signal assisting in controlling the degree of any deployment of said air bag;

wherein said sensor rotates and emits a signal to form a sensor array having at least a partial circular shape.

5. A vehicle sensing system for assisting in the selective deployment of an air bag near a seat, said seat including a buttocks supporting portion, a torso supporting portion and a head supporting portion, said vehicle sensing system comprising:

a sensor placed adjacent one of at least said head supporting portion and said torso supporting portion of said seat for detecting respectively a bust and a torso of an adult sitting in an upright position, said sensor in communication with an air bag system including said air bag, said sensor capable of sending a signal to said air bag system depending on whether said sensor detects objects, said signal assisting in controlling the degree of any deployment of said air bag; and a controller having air bag deployment logic where in response to adjustments of said seat said sensor adjusts its field of view and said air bag deployment logic is modified.

* * * * *